(12) United States Patent
Mueller

(10) Patent No.: US 7,921,548 B2
(45) Date of Patent: Apr. 12, 2011

(54) METHOD OF MANUFACTURING A HEATER RETENTION SPRING

(75) Inventor: Paul T. Mueller, Bloomington, MN (US)

(73) Assignee: Phillips & Temro Industries Inc., Eden Prairie, MN (US)

( * ) Notice: Subject to any disclaimer, the term of this patent is extended or adjusted under 35 U.S.C. 154(b) by 1204 days.

(21) Appl. No.: 11/509,748

(22) Filed: Aug. 24, 2006

(65) Prior Publication Data

US 2008/0047944 A1 Feb. 28, 2008

(51) Int. Cl.
*H05B 3/00* (2006.01)
(52) U.S. Cl. ............. 29/611; 29/613; 29/844; 29/896.9
(58) Field of Classification Search ............ 29/611, 29/613, 621.1, 844, 858, 887, 896.9; 123/549, 123/556; 219/205, 206, 505; 420/4, 53, 420/586, 586.1
See application file for complete search history.

(56) References Cited

U.S. PATENT DOCUMENTS

| | | | |
|---|---|---|---|
| 3,420,660 A * | 1/1969 | Katoh et al. | ................. 148/326 |
| 5,234,048 A | 8/1993 | Seike et al. | |
| 5,370,838 A * | 12/1994 | Sato et al. | ....................... 420/53 |
| 5,852,280 A | 12/1998 | Mizuno | |
| 6,651,632 B2 | 11/2003 | Thimmesch et al. | |
| 2004/0118388 A1 | 6/2004 | Geiger et al. | |
| 2005/0167411 A1 | 8/2005 | Geiger et al. | |
| 2006/0144376 A1 | 7/2006 | Gschwind et al. | |

* cited by examiner

Primary Examiner — Thiem Phan
(74) Attorney, Agent, or Firm — Harness, Dickey & Pierce, P.L.C.

(57) ABSTRACT

A method of manufacturing a heater having a heating element, an insulator and a spring is disclosed. The method includes forming a spring from an annealed superalloy material, heat treating the spring after forming, positioning the heating element in contact with the insulator, and biasedly engaging the spring with the insulator to maintain contact between the insulator and the heating element.

6 Claims, 3 Drawing Sheets

METHOD OF MANUFACTURING A HEATER RETENTION SPRING

BACKGROUND

The present disclosure generally relates to an apparatus for heating the air entering the cylinders of an internal combustion engine. More particularly, the present disclosure provides a heating element suspension used in a resistant wire heater.

The air entering the cylinders of an internal combustion engine is commonly heated to increase responsiveness to starting diesel fueled internal combustion engines as well as to decrease pollutant discharge. One type of air heater includes a serpentine shaped resistant element wire captured between two opposed heating element holders. Each heating element holder includes a ceramic thermal and electrical insulator positioned in a housing. A wave spring is positioned between the insulator and the housing to maintain a constant load of the ceramic insulator against the heating element. This suspension arrangement has been very effective in supporting the heating element in automotive applications where the heater is frequently subjected to vibration and impact loads as the vehicle travels across rough roads. Furthermore, this suspension maintains support of the heating element as the dimensions of the heating element change due to thermal expansion.

In some known heaters, the wave springs are constructed from stainless steel sheet. While this spring material has performed well during normal heater use, excessive, repetitive heater cycling is sometimes experienced in the field if engine starting difficulties occur. Frequent cycling of the heater prior to engine start causes increased temperatures to be experienced by many of the heater components. Depending on the temperature extremes reached, the wave springs may take a set. Once the wave springs have been permanently deformed, the heating element suspension no longer functions as designed and the heating element and ceramic insulator may be subjected to excess vibratory input. Open circuits, short circuits or mechanical retention concerns may arise.

SUMMARY

A heater includes an electrically conducting heating element, an insulator and a spring urging the insulator into contact with the heating element. The spring is formed from a superalloy and is operable to output a substantially constant force at a predetermined deflection up to approximately 650° C.

BRIEF DESCRIPTION OF THE DRAWINGS

The drawings described herein are for illustration purposes only and are not intended to limit the scope of the present disclosure in any way.

DETAILED DESCRIPTION OF THE PREFERRED EMBODIMENT

Figure 1:
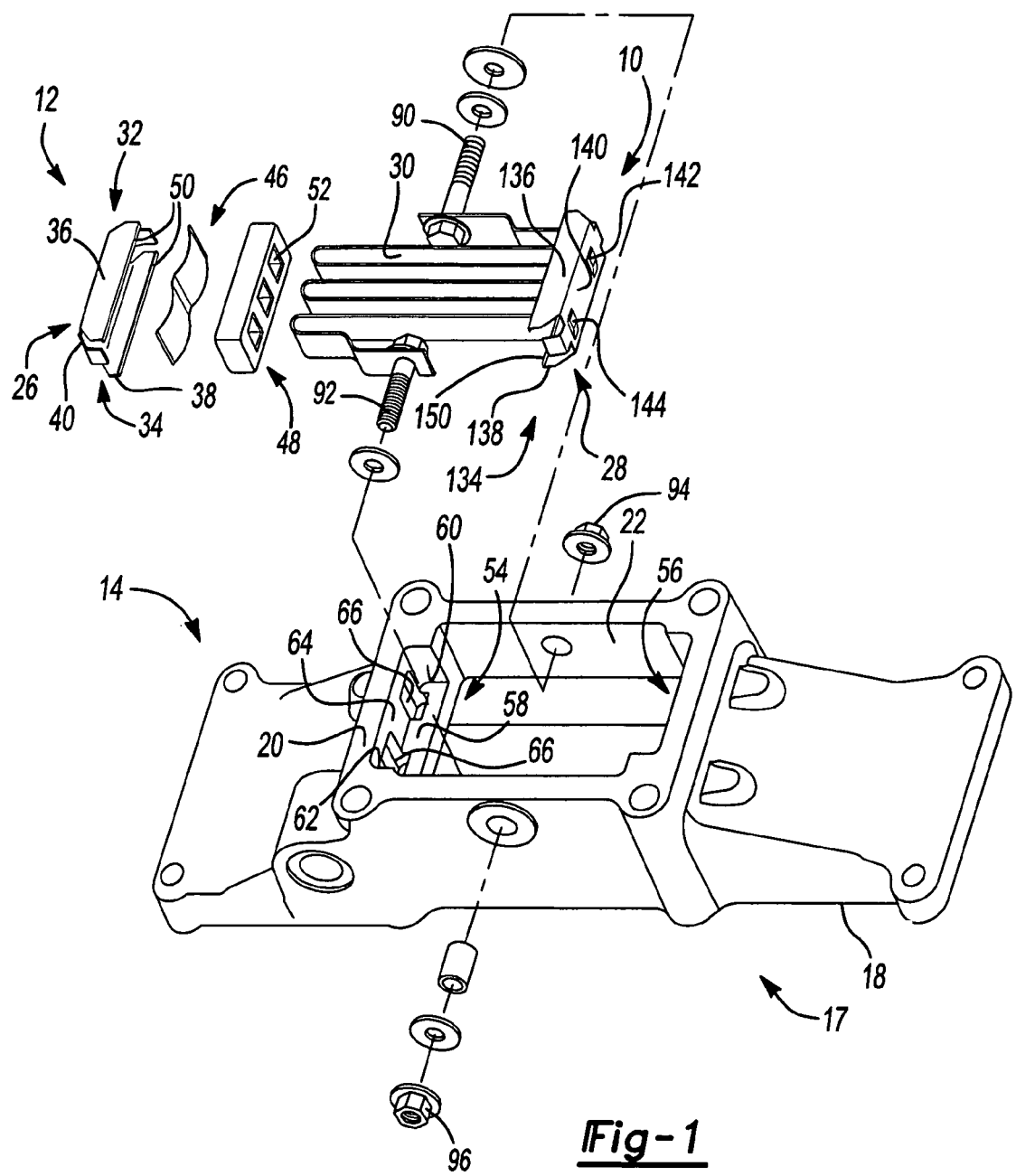
FIG. 1 is an exploded perspective view of an exemplary heater assembly including a heating element suspension of the present disclosure.

With reference to FIG. 1, a heating element suspension constructed in accordance with the teachings of the present disclosure is generally identified at reference numeral 10. Heating element suspension 10 functions in cooperation with an air heater 12 and an intake cover 14 to form an intake assembly 17. It should be appreciated that depending on the size of engine equipped, the specific size of the heater and quantity of heaters utilized may vary.

Intake cover 14 includes a first mounting face 18 which is connectable to the engine head (not shown) and a second mounting face 20 connectable to an air intake tube (not shown). Each of the mounting faces 18 and 20 serve to seal the engine intake passage from the environment surrounding the engine. Preferably, intake cover 14 is die cast from an aluminum alloy. Optimally, only faces 18 and 20 are machined leaving the remaining surfaces as cast.

Figure 2:
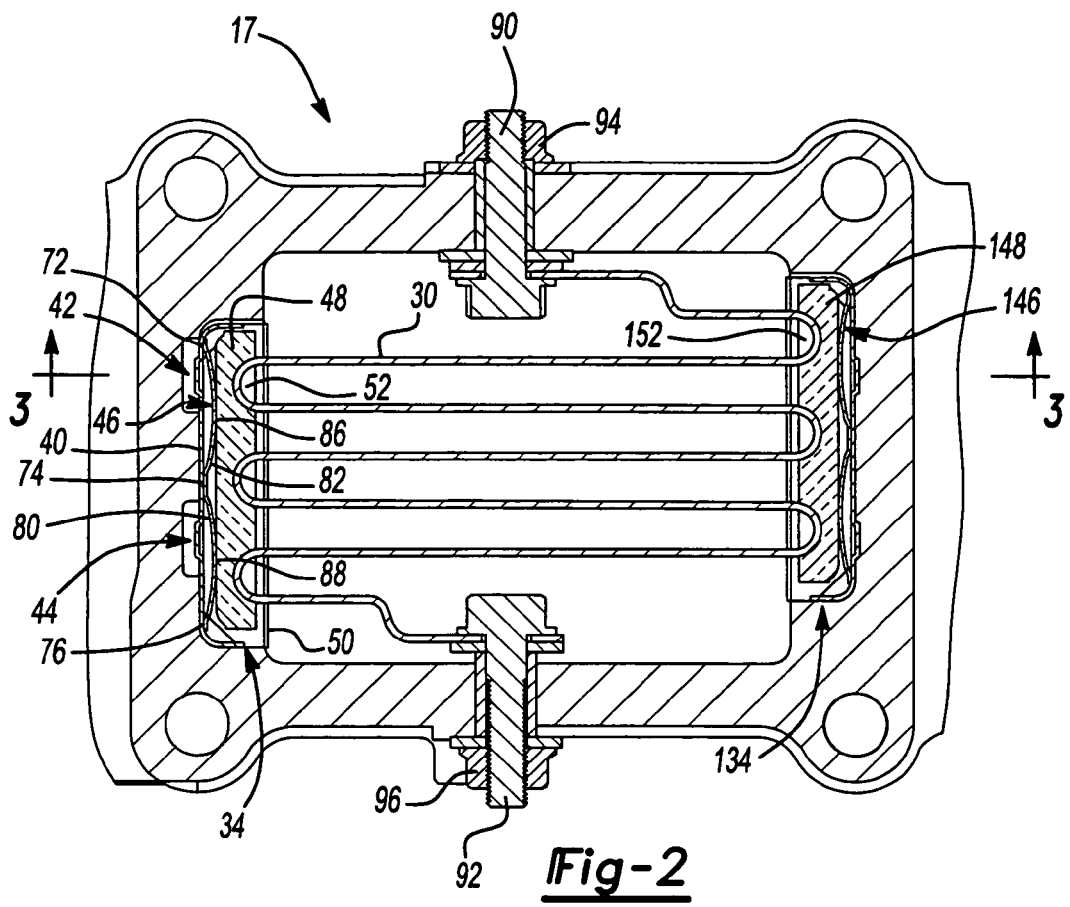
FIG. 2 is a cross-sectional view of the exemplary heater assembly.
Figure 3:
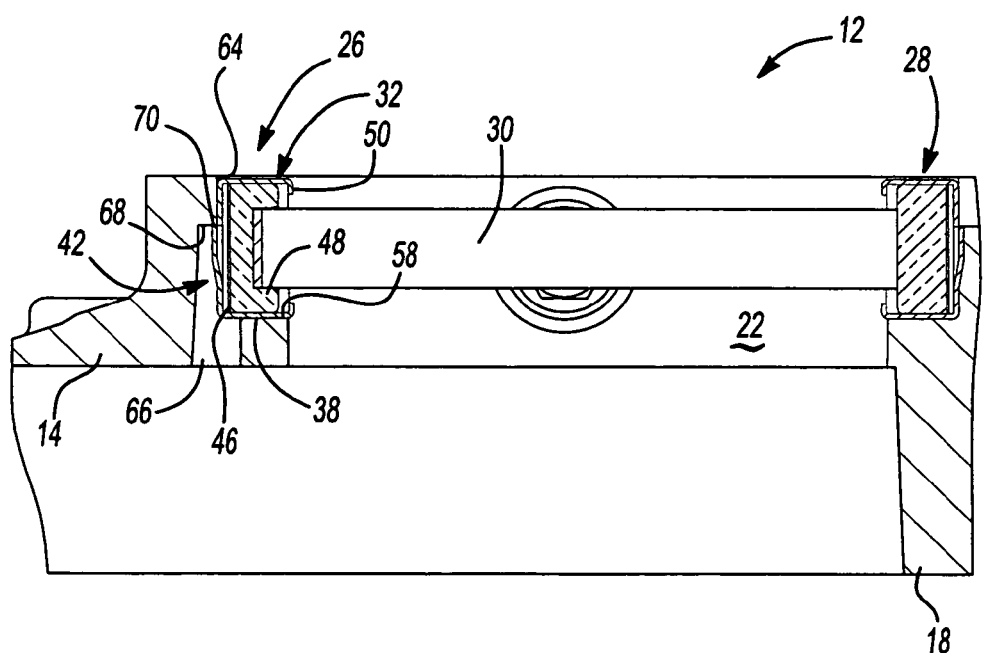
FIG. 3 is a partial cross-sectional view of the heater assembly.

As best illustrated in FIGS. 1-3, heater 12 is positioned within an aperture 22 extending through intake cover 14. During operation of the vehicle, intake air passes through aperture 22 in route to the combustion chambers.

Air heater 12 includes a first holder 26, a second holder 28 and a serpentine heating element 30. First holder 26 includes a housing 32 preferably shaped from a stainless steel sheet. Housing 32 defines a "C" shaped channel 34 closed on three sides by opposed side walls 36, 38 and end wall 40. Housing 32 includes tabs 42 and 44 protruding from end wall 40.

A wave spring 46 is disposed within channel 34 to engage end wall 40. A thermal and electrical insulator 48 is positioned within channel 34 to engage wave spring 46. It is contemplated that insulator 48 may be formed of a ceramic material to provide the desired thermal and electrical insulating properties. Wave spring 46 urges insulator 48 away from end wall 40 and toward stops 50 which extend inwardly into channel 34 from side walls 36 and 38. Insulator 48 includes cavities 52 to accommodate and position heating element 30 therein.

As shown in FIGS. 1 and 2, second holder 28 is configured in a substantially similar manner as first holder 26. Like elements are identified with reference numerals increased by 100. The configuration and inter-relation of channel 134, side walls 136 and 138, end wall 140, tabs 142 and 144, wave spring 146, insulators 148, stops 150 and cavities 152 are substantially the same as the corresponding components described earlier.

Within aperture 22, intake cover 14 further includes a generally "C" shaped recess 54 on one side of the aperture and another substantially similar recess 56 on the opposite side of aperture 22. Recess 54 is defined by a seat 58, a first wall 60, a second wall 62, and a third wall 64 interconnecting first wall 60 and second wall 62. Third wall 64 includes a pair of detents 66 formed therein. Each detent 66 terminates at a retaining wall 68 (FIG. 3).

To assemble air heater 12 to intake cover 14, the air heater is first sub-assembled and positioned relative to intake cover 14 as shown in FIG. 1. In the free state, end wall 40 of first holder 26 is spaced apart from end wall 140 of second holder 28 a distance greater than the separation between recess 54 and 56. Wave springs 46 and 146 are compressed by forcing first holder 26 toward second holder 28. During compression, air heater 12 is positioned within aperture 22.

As best shown in FIG. 3, air heater 12 is translated within aperture 22 until side wall 38 contacts seat 58. During the insertion or translation process, tabs 42 and 44 biasedly engage third wall 64. Once a face 70 of tab 42 clears retaining wall 68, tab 42 springs back to its free state position thereby entering detent 66. It should be appreciated that at this time face 70 of tab 42 would resist a force attempting to remove air heater 12 from first aperture 22 by engaging retaining wall 68. Therefore, once tabs 42 and 44 are snapped within detents 66, air heater 12 is securely coupled to intake cover 14. Wave springs 46 and 146 provide a biasing force to assure that tabs 42 and 44 remain positioned within detents 66. It should be appreciated that heating element suspension 10 assures that heating element 30 is securely retained.

Figure 4:
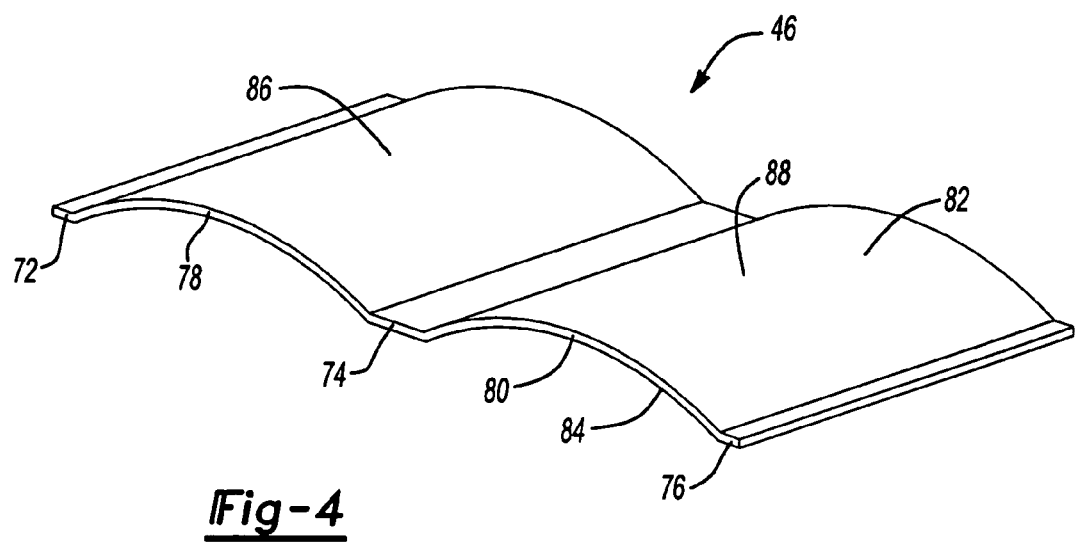
FIG. 4 is a perspective view of a wave spring of the heating element suspension.
Figure 5:
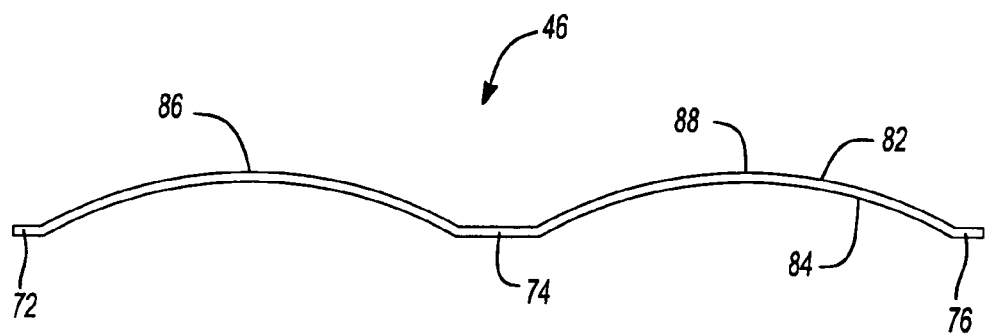
FIG. 5 is a side view of the wave spring shown in FIG. 4.

As most clearly shown in FIGS. 4 and 5, wave spring 46 is formed from a substantially planar sheet having a first seat 72, a second seat 74 and a third seat 76. First and third seats are formed at the ends of wave spring 46 while second seat 74 is formed in the center. Each of the seats extends across the entire width of wave spring 46. A first arched portion 78 extends between first seat 72 and second seat 74. A second arched portion 80 extends between second seat 74 and third seat 76. Wave spring 46 includes a first surface 82 and an opposite second surface 84. Three spaced apart locations of second surface 84 are aligned along a common plane at the locations of first, second and third seats 72, 74 and 76, respectively. Each of arched portions 78 and 80 have substantially the same radius of curvature and arc length such that a first tangent point 86 and a second tangent point 88 extend above the common plane defined by the spring seats the same distance.

With reference to FIG. 2, air heater 12 includes a first terminal 90 and a second terminal 92. First terminal 90 is electrically insulated from intake cover 14 while terminal 92 is electrically coupled thereto. Nuts 94 and 96 couple first terminal 90 and second terminal 92 to intake cover 14. Terminals 90 and 92 are electrically coupled in series such that an electrical path exists from terminal 90 through heating element 30 to terminal 90. Depending on the type of electrical circuit to be constructed, conductive and non-conductive attachment hardware is appropriately located throughout.

To keep the overall size of heater 12 to a minimum, heating element suspension 10 operates within a relatively small deflection range and high force range. In particular, wave springs 46 and 146 each output a force ranging from 19 N-65 N over a deflection range of 0.7 to 1.7 mm. Wave springs 46 and 146 are specifically designed to apply sufficient force to the ceramic insulator to keep it in contact and isolate the heating element 30 during road load vibration and to at least partially isolate the heating element from damaging loads. The maximum 65 N output force also assures that an excessive force is not applied to the heating element.

During testing, heating elements similar to heating element 30 were repeatedly energized to simulate field use of the heater assembly. These heating elements reached temperatures over 900° C. Additional analysis indicates that wave springs 46 and 146 may obtain temperatures up to 650° C. in certain instances. Design concerns exist with regard to providing a heater assembly capable of operating under these extreme conditions. For example, if the heating element is operating at temperatures exceeding 900° C., its tensile strength is greatly reduced. A spring force that is too large may deform the heating element. Furthermore, operation of air heater 12 repeatedly cycles wave springs 46 and 146 between a minimum deflection and a maximum deflection condition. The minimum deflection condition occurs when the heating element is not energized and the air heater is at ambient temperature. Maximum wave spring deflection typically occurs when the heating element is hot and thermally expanded.

Wave springs 46 and 146 are capable of providing proper suspension characteristics at the extreme temperatures and cycling noted. The present robust design was achieved by reviewing, analyzing and testing several spring materials. Wave springs 46 and 146 include desirable material characteristics such as corrosion resistance, high heat deflection capability, high modulus of elasticity and a high tensile strength. Furthermore, accumulated stress from repeated high deflections does not yield either wave spring.

Wave springs 46 and 146 are intended to be mass produced. Accordingly, wave spring design efforts included attempting to maximize formability and dimensional control as well as meeting the other characteristics previously discussed. Many spring materials were eliminated as possible candidates due to significant degradation of material properties at temperatures less than 650° C. Other materials may exhibit superior temperature ratings but may not be heat treated. Springs constructed from these materials would have to be formed in a hardened state. Tool wear and dimensional control concerns limit the feasibility of using these types of materials.

Wave springs 46 and 146 are preferably constructed from a superalloy material. The three types of superalloys include nickel, iron-nickel and cobalt based alloys that each exhibit superior mechanical characteristics above 540° C. Wave springs 46 and 146 may be constructed from any number of superalloys including A-286, A-706 and A-718. Each of these superalloys is categorized under the iron-nickel category having main constituents of chromium ranging from 12-22%, nickel ranging from 26-52% and iron ranging from 18-55%.

Nickel based superalloys may also be used to construct wave springs 46 and 146. The nickel based superalloys have three main constituents including chromium ranging from 10-25%, nickel ranging from 48-76% and a cobalt content less than 20%.

A number of alloy manufacturers have obtained trademarks relating to superalloys. Wave springs 46 and 146 may be constructed from Inconel materials including Inconel 706 and Inconel 718. Other superalloy trademarks or tradenames possibly suitable for use within wave springs 46 and 146 include Waspaloy, Haynes, Astroloy, Hastelloy, Nimonic, Pyromet and Udimet.

Wave springs 46 and 146 exhibit a tensile strength above 162,000 psi, a Young's modulus of $29 \times 10^6$ psi or greater, a Rockwell C hardness above 40 and a temperature rating of approximately 650° C. or greater. Loss of tensile strength at 650° C. is less than 20 percent.

To verify the wave spring concept, sample wave springs were constructed from Inconel 718 for testing. Inconel 718 includes approximately 19.0% Cr, 52.5% Ni, 3.0% Mo, 5.1% Nb, 0.9% Ti, 0.5% Al, 18.5% Fe, 0.08% C max and 0.15% Cu max. Inconel 718 is formable in the annealed state. This characteristic allows for consistent and controlled forming of the spring in a mechanical press. Inconel 718 includes nickel precipitates strengthened by intermetallic compound precipitation in a face-centered-cubic matrix. The nickel precipitates allow the material to be precipitation hardened in a vacuum furnace after forming.

To form wave spring 46, a thin sheet of annealed superalloy is placed into a die of a press. During a single operation, the spring is sheared from the sheet and formed as depicted in FIGS. 4 and 5. Many of the stamped springs are bulk packed and solution heat treated in a vacuum furnace for an 18 hour period. The solution is maintained at 1800° F. for a time commensurate with the thickness of wave spring 46. Precipitation hardening occurs by heating to 1350° F. for eight hours followed by ten hours of cooling and holding at 1150° F. The precipitation hardening method does not substantially change the dimensions of wave spring 46. Accordingly, wave spring 46 may be accurately and consistently formed using the mechanical press while the material is in the annealed state, subsequently heat treated and installed within air heater 12.

After wave springs 46 and 146 are formed as described, desirable spring material properties remain up to approximately 650° C. In addition, the yield strength and ultimate tensile strength of Inconel 718 may increase with age and temperature up to approximately 650° C. These properties allow continued proper suspension of insulators 48 and 148 as well as heating element 30. While specific mechanical properties and spring manufacture has been described in relation to forming sheets of Inconel 718, it should be appreciated that the same or similar processes are applicable for forming wave springs 46 and 146 from other superalloys as well.

The foregoing discussion discloses and describes exemplary embodiments of the present disclosure. One skilled in the art will readily recognize from such discussion and from the accompanying drawings and claims, that various changes, modifications and variations can be made therein without departing from the true spirit and fair scope of the invention.

What is claimed is:

1. A method of manufacturing a heater having a heating element, an insulator and a spring, the method comprising:
   forming a spring from a super alloy material;
   heat treating the spring by placing the spring in a solution maintained at 1800° F.;
   precipitation hardening the spring by heating the spring to 1350° F. for eight hours followed by ten hours of cooling and holding at 1150° F.;
   positioning the heating element in contact with the insulator; and
   biasedly engaging the spring with the insulator to maintain contact between the insulator and the heating element.

2. The method of claim 1 further including forming an arched portion between substantially planar seat portions on the spring prior to heat treating.

3. The method of claim 1 wherein forming the spring includes stamping the spring in a press from a substantially planar sheet.

4. The method of claim 1 wherein the superalloy material includes 12 to 22 percent Chromium, 26 to 52 percent Nickel and 18 to 55 percent Iron.

5. The method of claim 1 wherein the superalloy is one of the group consisting of Inconel 718, Inconel 706, A-286 and Waspaloy.

6. The method of claim 1 wherein the superalloy includes 10 to 25 percent Chromium, 48 to 76 percent Nickel and less than 20 percent Cobalt.

\* \* \* \* \*